3,445,523
STABILIZATION OF ORGANIC HYDROPEROXIDES
Rudolph Rosenthal, Broomall, and Giovanni A. Bonetti, Wynnewood, Pa., assignors to Atlantic Richfield Company, Philadelphia, Pa., a corporation of Pennsylvania
No Drawing. Filed Dec. 20, 1965, Ser. No. 515,247
Int. Cl. C07c *73/06;* B01j *1/18*
U.S. Cl. 260—610                              6 Claims

ABSTRACT OF THE DISCLOSURE

Organic hydroperoxides stabilized with an aqueous mixture of (1) sodium or potassium hydroxide, (2) sodium or potassium dihydrogen phosphate, the pH of the hydroxide and aqueous mixture being 7 to 8.

---

This invention relates to stabilization of organic hydroperoxides.

Organic hydroperoxides are becoming increasingly important in the industrial world. They are widely used as oxidizing agents in the production of organic peroxides, and for other purposes. One difficulty in the use of these peroxides is that they are comparatively unstable, particularly at elevated temperatures. The field of use for these compositions would be even greater were it not for this instability.

The object of the present invention is to provide organic hydroperoxide compositions of improved stability. A specific object of this invention is to provide a composition comprising tertiary-butyl alcohol and tertiary-butyl hydroperoxide which is comparatively stable at elevated temperatures.

Other objects and advantages of the present invention will be apparent to one skilled in the art upon reading this disclosure.

Broadly, our invention is based upon the discovery that organic hydroperoxides can be stabilized by the addition of an aqueous mixture of (1) sodium or potassium hydroxide and (2) sodium or potassium dihydrogen phosphate, where the mixture has a pH of 7 to 8. Stated in another way, our invention resides in a composition comprising an organic hydroperoxide and a stabilizing amount of an aqueous mixture of (1) sodium or potassium hydroxide and (2) sodium or potassium dihydrogen phosphate, said mixture containing both sodium and potassium ions, said mixture having a pH of 7 to 8.

From the above, it will be apparent that the invention is comparatively narrow requiring one of the two recited hydroxides and one of the two recited phosphates. Of course, the stabilizing solution can contain mixtures of the hydroxides or phosphates.

However, the mixture, when used, should have a pH in the range of 7 to 8. A pH of approximately 7.2 is preferred.

Comparatively small amounts of the hydroxide and phosphate are necessary to obtain good results. A broad range which provides a stabilizing effect is to provide the aqueous mixture in an amount such that there are present from 0.0001 to 0.01 mol of hydroxide and 0.0001 to 0.01 mol phosphate per mol of hydroperoxide. Best results are obtained when the hydroxide and phosphate are present in the amount to provide 0.0005 to 0.005 mol of each per mol of hydroperoxide. The preferred range provides good stability of the hydroperoxide without the use of a large excess of the stabilizer.

The invention is suitable for stabilization of all of the hydrocarbon hydroperoxides now in use. These include hydroperoxides derived from the tertiary lower aliphatic hydrocarbons such as isobutane and the isopentanes, isohexanes, isoheptanes, etc., and mixtures thereof. The hydroperoxides can be those derived from cyclic alkanes and alkenes, compounds such as cyclopentane, cyclohexane, cyclohexene, and alkyl substituted derivatives thereof, such as methylcyclohexane. These stabilizers are suitable in use with the aromatic hydroperoxides, for example, the alkylbenzenes such as ethylbenzene, isobutylbenzene, etc.

Specific examples of suitable hydroperoxides include tert-butyl hydroperoxide, tert-amyl hydroperoxide, cyclohexyl hydroperoxide, cyclohexenyl hydroperoxide, 2-methylbutene hydroperoxide, cumene hydroperoxide, diisopropylbenzene hydroperoxide, para-isopropyltoluene hydroperoxide, ethylbenzene hydroperoxide, alpha-tetralyl hydroperoxide. Finally, diisopropyl ketone hydroperoxide can be stabilized using our stabilizer.

The stabilizers of our invention are suitable for use with the pure hydroperoxide, mixtures of different hydroperoxides, and mixtures of the hydroperoxides with solvents therefor. In some methods of production of the hydroperoxide other materials are produced at the same time and the stabilizers can be used with the reaction mixture as it is obtained before further purification. In fact, these stabilizers are quite suitable for addition to the raw reaction mixture providing stabilization during purification of the hydroperoxide. As a specific example of such a production process, there can be mentioned the production of tertiary-butyl hydroperoxide by the air oxidation of isobutane in liquid phase. The reaction mixture contains a mixture of tertiary-butyl hydroperoxide and tertiary-butyl alcohol. The stabilizer of our invention has been found to be very suitable for such a mixture.

Examples which follow illustrate specific embodiments of our invention. They should be considered as illustrative and not as unduly limiting the invention.

CONTROL

To determine the normal decomposition rate of mixtures of tertiary-butyl hydroperoxide and tertiary-butyl alcohol, a number of runs were made. In all, 7 runs were made in which 3 grams of the hydroperoxide were mixed with 3 grams of the alcohol and the mixture maintained at 125° C. for 4 hours. The decomposition rates ranged from 3.7 to 5.2 percent decomposition of the hydroperoxide per hour. The average decomposition was 4.2 percent per hour.

PREPARATION OF STABILIZER

A stabilizer solution was made by diluting a mixture of 35 milliliters of 0.1 normal sodium hydroxide and 50 milliliters of 0.1 molar potassium dihydrogen phosphate to 100 milliliters. The solution had a pH of 7.2 and a specific gravity of 1.004. The solution provided 0.0014 gram of sodium hydroxide and 0.0068 gram of potassium dihydrogen phosphate per milliliter of buffer solution.

TEST PROCEDURE

In all of the examples given herein, the following test procedure was used. The runs were made in 25 milliliters Pyrex glass test tubes fitted with stainless steel pressure caps with rubber O rings. The O rings were wrapped with Teflon polytetrafluoroethylene tape. The procedure was to heat the tubes and caps in dilute nitric acid solution for one hour at about 90° C. followed by a 30 minute soaking in 2 weight percent sodium pyrophosphate solution. This was followed by water washing.

Following this cleaning procedure, the hydroperoxide and the alcohol were added followed by the other ingredients as specified. Thereafter, the tubes were sealed and maintained at an elevated temperature for the period of time given. At the end of the heating period, the hydroperoxide content was determined.

For the hydroperoxide determination, the hydroperoxide was taken up in a 50/50 volume mixture of chloroform and acetic acid. Potassium iodide was added and, after 10 minutes, the iodine titrated with 0.1 N sodium thiosulfate to the starch end point.

Example 1

The stabilizer solution described above was used to stabilize mixtures of tertiary-butyl hydroperoxide and tertiary-butyl alcohol. In one series of runs, 1 gram of the stabilizer solution was mixed with a mixture of 2.5 grams of each of the hydroperoxide and the alcohol. Per mol of hydroperoxide, this provided 0.00125 mol of sodium hydroxide and 0.0018 mol of the potassium dihydrogen phosphate. Over a 4 hour run the average decomposition of the hydroperoxide was 1.1 percent per hour, all of the runs being carried out for 4 hours at 125° C.

Example 2

The procedure of Example 1 was repeated using 2 grams of the stabilizer solution and 2 grams each of the hydroperoxide and the alcohol. Per mol of hyperoxide, this provided 0.00315 mol of sodium hydroxide and 0.0045 mol of potassium dihydrogen phosphate. At this level, the average decomposition for a series of runs was 1.8 percent.

Example 3

Metal ions accelerate the decomposition of tertiary-butyl hydroperoxide but the stabilizers of our invention are still effective in the presence of metal salts.

For a control run, a mixture of 3 grams each of tertiary-butyl hydroperoxide and tertiary-butyl alcohol was used and a 6 percent iron naphthenate solution was added in an amount to provide 10 parts per million of iron based on the hydroperoxide. Over a period of 4 hours while maintaining the mixture at 110° C., the hydroperoxide decomposed at a rate of 10 percent per hour.

Keeping other conditions the same, the above run was repeated with the addition of 0.5 gram of the sodium hydroxide/potassium dihydrogen phosphate stabilizer added. Per mol of hydroperoxide, this provided 0.00053 mol of sodium hydroxide and 0.00075 mol of potassium dihydrogen phosphate. The percent decomposition was reduced to 0.96 percent per hour.

Example 4

The stabilizer solution of our invention is also effective when molybdenum ions are present.

In one run, 6 grams of an equal weight mixture of tertiary-butyl hydroperoxide and tertiary-butyl alcohol was maintained at 110° C. for 4 hours. Molybdenum, as a solution of molybdenum hexacarbonyl in tertiary-butyl alcohol, was added in an amount of 58 parts per million based upon the hydroperoxide. Over the 4 hour period, the hydroperoxide decomposed at a rate of 2.9 percent per hour.

Keeping other conditions the same, the above run was repeated except that 0.5 gram of the sodium hydroxide/potassium dihydrogen phosphate stabilizer was added. The stabilizer reduced the hydroperoxide decomposition rate to a level of 0.8 percent per hour.

Example 5

The stabilizer of our invention also stabilizes tertiary-butyl hydroperoxide in the presence of formic acid.

To 6 grams of an equal weight mixture of the hydroperoxide and tertiary-butyl alcohol, 0.018 gram of formic acid was added. The mixture was maintained at a temperature of 110° C. for 4 hours which resulted in hydroperoxide decomposition at a rate of 3 percent per hour.

Keeping other conditions the same, this run was repeated except for the addition of 0.52 gram of the sodium hydroxide/potassium dihydrogen phosphate stabilizer solution. The decomposition rate was reduced to 0.55 percent per hour.

The above examples show that the decomposition of the hydroperoxide can be maintained at a low level with the stabilizers of our invention. Elevated temperatures were used to increase the rate of decomposition and the stabilized mixtures would remain stable for much longer periods at lower temperatures.

When stabilization is no longer required, the mixture can be made slightly acid to destroy the effect of the stabilizer. For this, dilute aqueous inorganic acids are preferred since the hydroperoxide can be easily separated therefrom. Sulfuric and hydrochloric acids are examples of suitable acids.

Another method for recovery of the hydroperoxide is to use vacuum distillation to separate it from the stabilizer.

As many possible embodiments can be made of this invention without departing from the scope thereof, it is to be understood that all matter herein set forth is to be interpreted as illustrative and not in a limiting sense.

We claim:
1. A composition comprising an organic hydroperoxide selected from the group consisting of tert-butyl hydroperoxide, tert-amyl hydroperoxide, cyclohexyl hydroperoxide, cyclohexenyl hydroperoxide, 2-methylbutene hydroperoxide, cumene hydroperoxide, diisopropylbenzene hydroperoxide, paraisopropyltoluene hydroperoxide, ethylbenzene hydroperoxide, alpha-tetralyl hydroperoxide, and diisopropyl ketone hydroperoxide, and a stabilizing amount of an aqueous of (1) sodium or potassium hydroxide and (2) sodium or potassium dihydrogen phosphate, said mixture containing both sodium and potassium ions, and having a pH of 7 to 8.

2. The composition of claim 1 wherein said hydroxide and said phosphate are present in an amount of 0.0001 to 0.01 mol of each per mol of hydroperoxide.

3. The composition of claim 1 wherein said hydroxide and said phosphate are present in an amount of 0.0005 to 0.005 mol of each per mol of hydroperoxide.

4. The composition of claim 1 wherein said hydroperoxide is a lower aliphatic hydroperoxide.

5. The composition of claim 1 wherein said organic hydroperoxide is tertiary-butyl hydroperoxide in admixture with tertiary-butyl alcohol and the stabilizer is an aqueous mixture of sodium hydroxide and potassium dihydrogen phosphate, said stabilizer being present in an amount of 0.0005 to 0.005 mol of sodium hydroxide and 0.0005 to 0.005 mol of potassium dihydrogen phosphate per mol of the hydroperoxide.

6. The composition of claim 5 wherein said aqueous mixture has a pH of approximately 7.2.

References Cited

UNITED STATES PATENTS

| | | |
|---|---|---|
| 2,176,407 | 10/1939 | Milas. |
| 2,347,434 | 4/1944 | Reichert et al. |
| 2,527,640 | 10/1950 | Lorand et al. _____ 260—610 |

BERNARD HELFIN, *Primary Examiner*.

W. B. LONE, *Assistant Examiner*.